(12) United States Patent
Ifland

(10) Patent No.: US 7,588,750 B2
(45) Date of Patent: Sep. 15, 2009

(54) SYSTEMS AND METHODS FOR GENERATING AND STORING OZONE

(75) Inventor: Jeff Ifland, Cupertino, CA (US)

(73) Assignee: Amarante Technologies, Inc., Santa Clara, CA (US)

(*) Notice: Subject to any disclaimer, the term of this patent is extended or adjusted under 35 U.S.C. 154(b) by 128 days.

(21) Appl. No.: 11/825,157

(22) Filed: Jul. 3, 2007

(65) Prior Publication Data
US 2009/0010835 A1    Jan. 8, 2009

(51) Int. Cl.
*B01J 19/08* (2006.01)
*C01B 13/10* (2006.01)

(52) U.S. Cl. .................. 423/581; 422/105; 422/108; 422/186.07; 422/186.08; 422/186.11; 422/186.18; 422/186.3; 204/157.5; 204/176

(58) Field of Classification Search ............. 204/157.5, 204/176; 422/105, 108, 186.07, 186.08, 422/186.11, 186.18, 186.3; 423/581
See application file for complete search history.

(56) References Cited

U.S. PATENT DOCUMENTS

| | | | | |
|---|---|---|---|---|
| 3,619,403 | A | * | 11/1971 | Gorin .................... 422/186.05 |
| 3,963,625 | A | | 6/1976 | Lowther |
| 4,124,467 | A | | 11/1978 | Pincon |
| 4,131,528 | A | | 12/1978 | Tsujimoto et al. |
| 4,140,608 | A | | 2/1979 | Vaseen |
| 4,252,623 | A | | 2/1981 | Vaseen |
| 4,427,636 | A | * | 1/1984 | Obenshain ............. 422/186.07 |
| 4,462,965 | A | | 7/1984 | Azuma et al. |
| 4,604,279 | A | * | 8/1986 | Leitzke et al. ................ 423/581 |
| 4,859,429 | A | | 8/1989 | Nisenson |
| 5,004,587 | A | | 4/1991 | Tacchi |
| 5,632,868 | A | * | 5/1997 | Harada et al. ................ 204/176 |
| 5,644,070 | A | * | 7/1997 | Gibboney et al. ............ 73/23.2 |
| 5,705,468 | A | * | 1/1998 | Yant et al. .................... 510/370 |
| 6,007,785 | A | | 12/1999 | Liou |
| 6,193,852 | B1 | * | 2/2001 | Caracciolo et al. .......... 204/176 |
| 6,277,248 | B1 | * | 8/2001 | Ishioka et al. ................ 204/176 |
| 6,334,979 | B1 | | 1/2002 | Carman et al. |
| 6,530,976 | B2 | | 3/2003 | Murai |
| 6,596,160 | B2 | | 7/2003 | Lee |
| 6,916,359 | B2 | | 7/2005 | Jain |
| 7,128,872 | B2 | | 10/2006 | Robitaille et al. |
| 7,402,289 | B2 | * | 7/2008 | Tabata .................... 422/186.07 |

FOREIGN PATENT DOCUMENTS

WO    WO 2004/060494    7/2004

* cited by examiner

*Primary Examiner*—Timothy C Vanoy
(74) *Attorney, Agent, or Firm*—Patent Office of Dr. Chung S. Park

(57) ABSTRACT

Devices for generating and storing ozone. The device includes a tank for containing gas therein; an ozone generator for generating ozone and communicating the ozone with the tank; and at least one valve for admitting gas into the device, holding gas in the device, and discharging gas from the device.

19 Claims, 6 Drawing Sheets

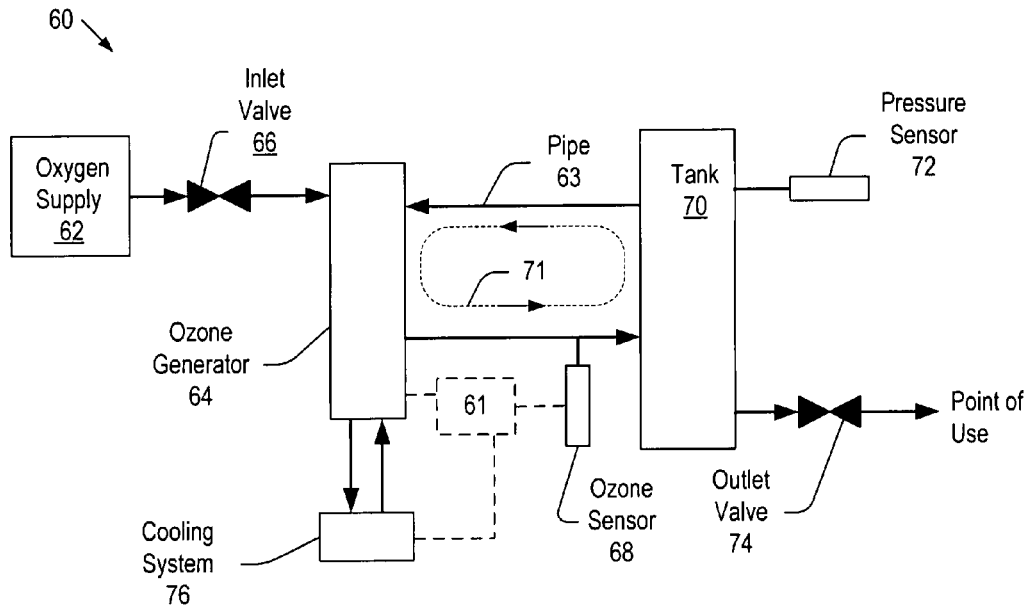
FIG. 3
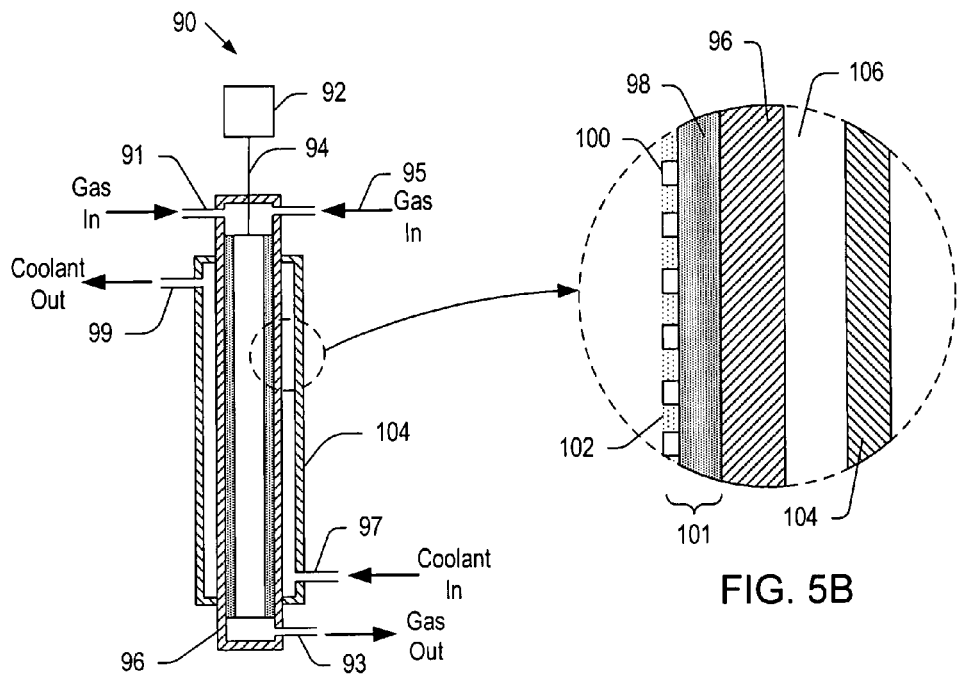
FIG. 5A
FIG. 5B

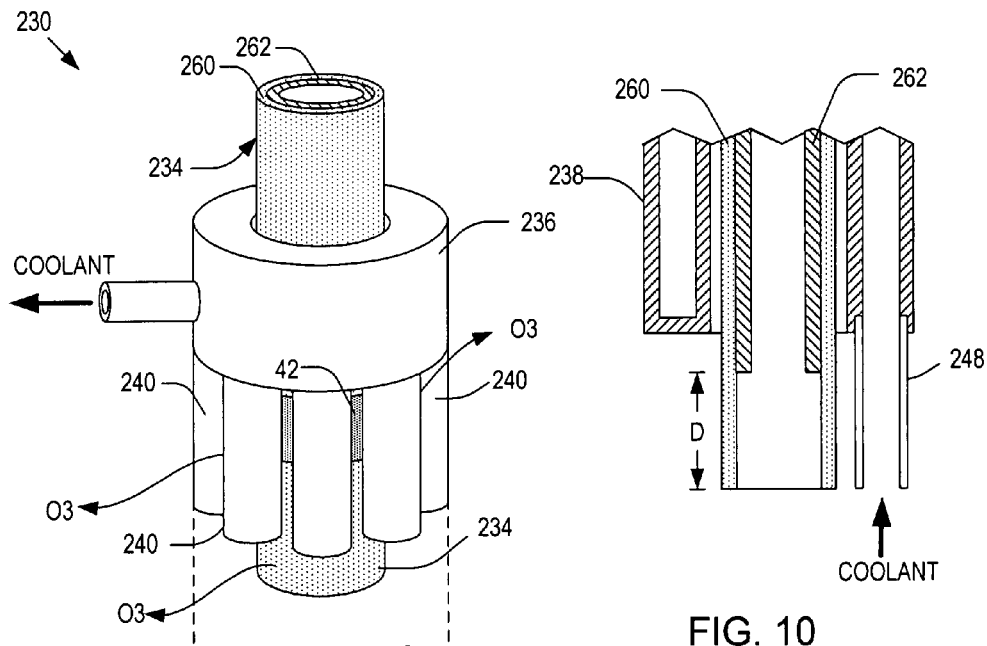
FIG. 10
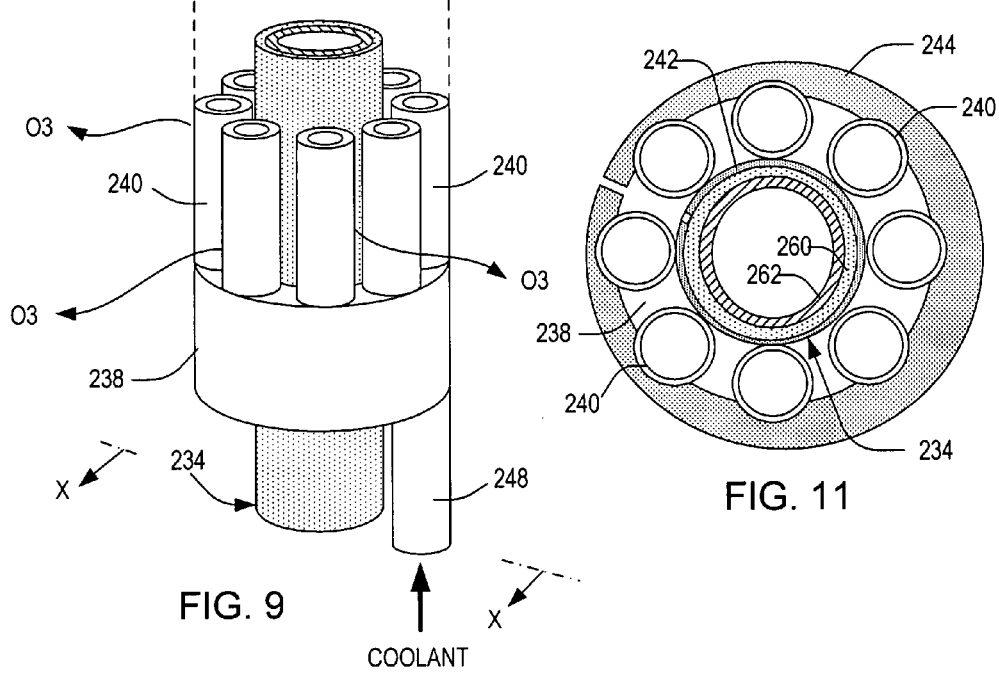
FIG. 9
FIG. 11

SYSTEMS AND METHODS FOR GENERATING AND STORING OZONE

CROSS REFERENCE TO RELATED APPLICATIONS

This application is related to U.S. application No. 11/897,390, filed in Aug. 29, 2007, entitled "Ozone Generating Device," which is a continuation-in-part of application Ser. No. 11/825,183, filed on Jul. 3, 2007, now abandoned, which is hereby incorporated by reference in its entirety.

BACKGROUND

The present invention generally relates to ozone synthesis, more particularly, to generating and storing ozone.

Ozone (O3) is a form of oxygen that has three atoms per molecule rather than two atoms as found in bimolecular oxygen. Each ozone molecule decomposes into molecular oxygen (O2), releasing an extra oxygen atom. This extra oxygen atom is a strong oxidizing agent and known as a potent bactericide and viricide.

Conventionally, ozone gas is produced as needed at the point of use rather than being produced beforehand and stored, or being purchased and transported to the point of use. This is mainly because ozone gas constantly decays back to oxygen. For instance, the half-life of ozone in a clean stainless steel tank is on the order of a few days at room temperature. As such, for many applications where a constant and/or continuous flow of ozone gas is needed, the ozone gas is produced near or at the point of use. However, there are applications that require a periodic or intermittent use of ozone gas, some requiring a large quantity of ozone gas with a relatively short time notice. For instance, a typical ozone generating system may require several minutes to fill a conventional batch type sterilization chamber, which can limit the operational speed of the entire sterilization system.

In a typical batch type sterilization process using ozone, a sterilization chamber is first loaded with the articles to be sterilized. Then, the chamber is evacuated and then backfilled with ozone. Conventionally, the chamber is filled with ozone as it is produced by an ozone generator. The time required to backfill the chamber with ozone is determined by the rate of production of the ozone, which is in turn determined by the size of the ozone generator. Because backfill time is part of the overall cycle time, it is desirable for the backfill time to be as short as possible. Even a very large conventional ozone generator may require several minutes to fill a typical sterilizer chamber.

Therefore, for certain applications, there is a strong need for a system that can generate and store ozone gas and maintain an intended concentration of ozone during storage so that a sufficient quantity of ozone can be immediately provided to the point of use upon demand.

SUMMARY OF THE DISCLOSURE

In one embodiment, a device for generating ozone includes: a tank for containing gas therein; an ozone generator for generating ozone and communicating the ozone with the tank; and at least one valve for admitting gas into the device, holding gas in the device, and discharging gas from the device.

In another embodiment, a method for operating an ozone generation device including a tank and an ozone generator in fluid communication with the tank includes the steps of: providing gas including oxygen into the device; storing the gas in the tank; and causing the ozone generator to convert part of the oxygen in the tank into ozone.

BRIEF DESCRIPTION OF THE DRAWINGS

FIG. 3 shows a schematic diagram of yet another embodiment of an ozone generation system in accordance with the present invention;

FIG. 5A shows a schematic diagram of another exemplary ozone generator that might be used in the systems of FIGS. 1-3;

FIG. 5B is an enlarged view of a portion of the ozone generator in FIG. 5A;

FIG. 9 shows a perspective view of an electrode assembly in FIG. 8;

FIG. 10 shows a schematic cross sectional view of the electrode assembly in FIG. 9, taken along the line X-X; and FIG. 11 shows a schematic cross sectional view of the electrode assembly in FIG. 9, taken along the line XI-XI.

DETAILED DESCRIPTION OF THE PREFERRED EMBODIMENTS

The following detailed description is of the best currently contemplated modes of carrying out the invention. The description is not to be taken in a limiting sense, but is made merely for the purpose of illustrating the general principles of the invention because the scope of the invention is best defined by the appended claims.

Figure 1:
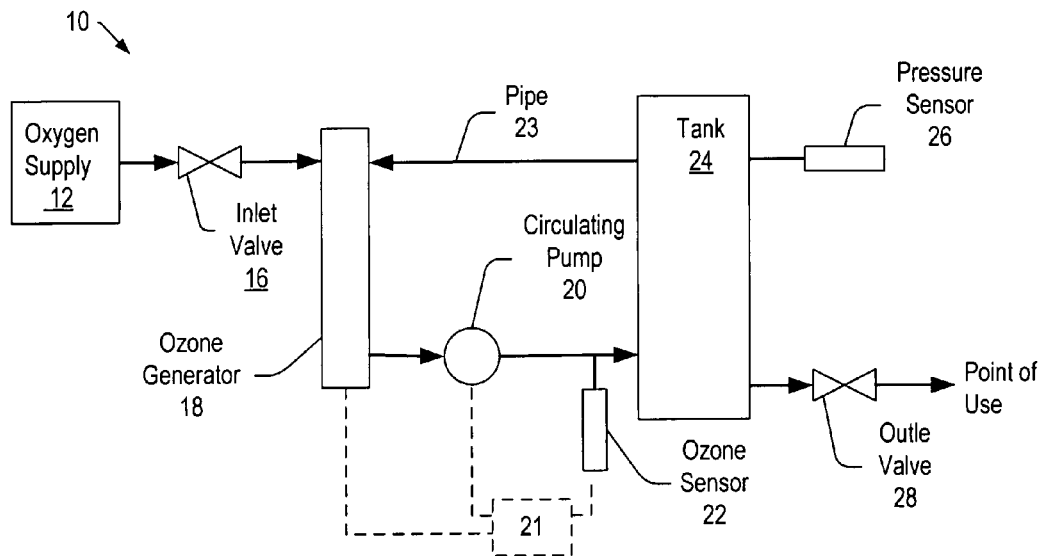
FIG. 1 shows a schematic diagram of an embodiment of an ozone generation system in accordance with the present invention.

Referring now to FIG. 1, FIG. 1 shows a schematic diagram of an embodiment of an ozone generation system 10 in accordance with the present invention. As depicted, the system 10 includes: an ozone generator 18 for converting oxygen gas into ozone gas; a tank 24 for storing the gas transferred from the ozone generator 18 thereto; and a circulating pump 20 for circulating gas between the ozone generator 18 and tank 24. A detailed description of the ozone generator 18 is given in conjunction with FIGS. 4, 5A, and 5B. The system 10 also includes an ozone sensor 22 for measuring the ozone concentration of the gas transferred from the ozone generator 18 by the pump 20 and a pressure sensor 26 for measuring the gas pressure in the tank 24. It is noted that the ozone sensor 22 can be mounted at any suitable location, such as in the wall of the tank 24.

The system 10 further includes an inlet valve 16 for filling the system 10 with oxygen gas from an oxygen supply 12. At least a portion of the oxygen gas received through the inlet valve 16 is converted into ozone gas by the ozone generator 18. Those skilled in the art will understand that other types of gas may be introduced into the system 10 through the valve 16. For instance, oxygen comprises approximately 20% of the volume of air, and air is frequently used in place of pure oxygen gas when the low concentration of oxygen does not militate against the desired result. Likewise, medical grade pure oxygen gas may be introduced into the system 10 if necessary. Thus, hereinafter, for convenience, the term oxygen gas refers to the oxygen gas in its pure form or in a dilute form such as in air. Also, the term ozone gas refers to the ozone gas in its pure form or in a diluted form mixed with oxygen gas.

The system 10 includes an outlet valve 28 through which the gas contained in the tank 24 is discharged to the point of use. The system 10 also includes a pipe 23 for fluid communication between the ozone generator 18 and tank 24 that preferably contains gas in gas state. (Hereinafter, a tank is considered as a container for preferably storing gas in gas state.) The circulating pump 20 transfers gas from the ozone generator 18 to the tank 24, while the gas in the tank 24 flows into the ozone generator 18 through the pipe 23 to thereby generate recirculation of the gas within the system 10.

It is noted that the system 10 may include more than one pressure sensor and ozone sensor. Also, these sensors may be located in any suitable locations. For instance, an additional ozone sensor may be attached to the wall of the ozone generator 18. It is also noted that more than one ozone generator and/or tank may be used in the system 10.

The system 10 can be operated in a batch mode. As a first step of the batch mode operation, the inlet valve 16 opens to fill the system 10 with oxygen gas from the oxygen supply 12 while the outlet valve 28 is closed. When a desired pressure is reached in the tank 24, the inlet valve 16 is closed and the ozone generator 18 runs until the ozone sensor 22 indicates that an intended ozone concentration is reached. Then, the ozone generator 18 shuts off and the system 10 enters a storage phase.

During the storage phase, an optional feedback control system 21 can be used to maintain the ozone concentration level. It is well known that ozone gas continuously decays back into oxygen gas. The ozone sensor 22 measures the ozone concentration and sends an electrical signal commensurate with the concentration to the feedback control system 21. If the ozone concentration in the tank 24 decreases below an intended level due to the natural decay, the feedback control system 21, which may include a microprocessor, may activate the ozone generator 18 and circulating pump 20 to make up for the loss of ozone in the tank 24 due to the natural decay and thereby to restore and maintain the ozone concentration level in the tank 24. When ozone gas is requested at the point of use, the gas in the tank 24 is discharged to the point of use through the outlet valve 28, completing a batch mode cycle.

Figure 2:
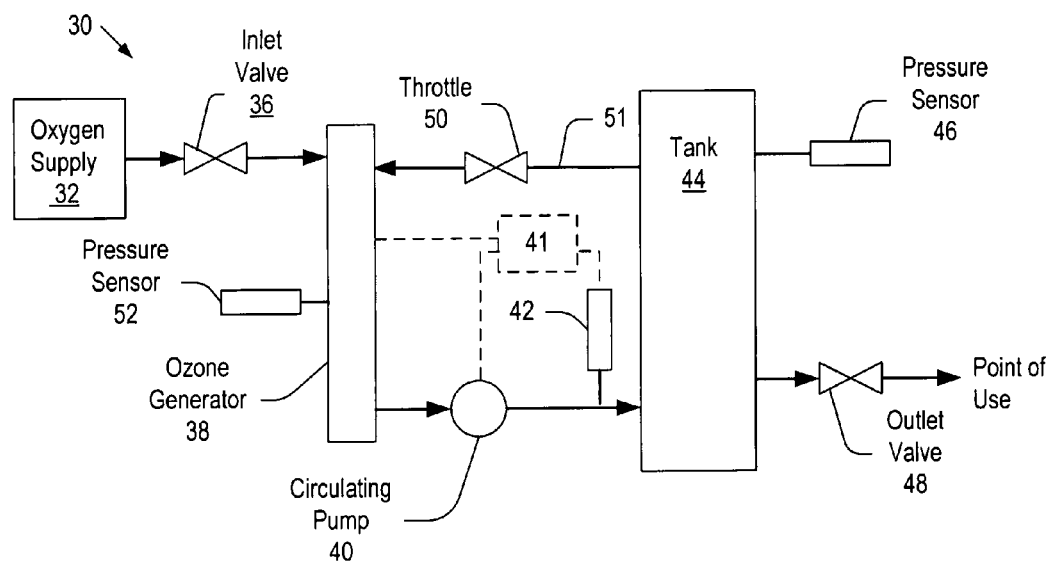
FIG. 2 shows a schematic diagram of another embodiment of an ozone generation system in accordance with the present invention.

FIG. 2 shows a schematic diagram of another embodiment of an ozone generation system 30 in accordance with the present invention. As depicted, the system 30 is similar to the system 10, with the differences that an optional pressure sensor 52 can be used to measure the gas pressure in the ozone generator 38 and a throttle 50 is added to a gas line or pipe 51 disposed between the tank 44 and ozone generator 38. The throttle 50 controls the gas flow rate from the tank 44 to the ozone generator 38. The throttle 50 allows the tank 44 to operate at a higher gas pressure than the ozone generator 38 during recirculation such that the ozone generator 38 may operate at its optimum gas pressure while the tank 44 has a higher gas pressure. Higher pressure in the tank 44 means that the tank 44 can store larger amount of ozone gas at a given tank volume.

Preferably, the circulation pump 40 operates in tandem with the ozone generator 38. Thus, when the circulation pump 40 is off, the ozone generator 38 is also off such that the gas pressure in the ozone generator 38 can rise to that of the tank 44, possibly over the operational range of the ozone generator 38, without inflicting any damage on the ozone generator 38.

The system 30 can be operated in a batch mode as the system 10. During the storage phase of the batch mode, the ozone sensor 42 measures the ozone concentration in the tank 44 and may send an electrical signal commensurate with the concentration to an optional feedback control system 41. If the ozone concentration in the tank 44 decreases below an intended level due to the natural decay, the feedback control system 41 may activate the ozone generator 38, circulating pump 40, and throttle 50 to make up for the loss of ozone due to the natural decay and thereby to restore and maintain the intended ozone concentration level in the tank 44.

FIG. 3 shows a schematic diagram of yet another embodiment of an ozone generation system 60 in accordance with the present invention. As depicted, the system 60 is similar to the system 10, with the differences that a circulation pump is not used in the system 60 and a cooling system 76 is coupled to an ozone generator 64. The other components, such as oxygen supply 62, inlet valve 66, pressure sensor 72, outlet valve 74, have similar structure and operational mechanisms as their counterparts in FIG. 1. The cooling system 76 coupled to the ozone generator 64 may be used to cool the gas in the ozone generator 64. In the system 60, gas recirculation in the direction of an arrow 71 is achieved by cooling the gas in the ozone generator 64 to a cooler temperature than that in the tank 70, causing a thermal convection flow. The cooler, denser gas flows downward in the ozone generator 64 and proceeds into the bottom portion of the tank 70, while the warmer gas in the top portion of the tank 70 flows into the top portion of the ozone generator 64 through a pipe 63.

The thermal convection flow is aided by the difference in density between ozone and oxygen. For example, the increase in density of oxygen gas by converting 10% of it to ozone is almost as much as the increase in density by cooling the oxygen from 20° C. to 0° C. The gas exiting the ozone generator 64 has a higher ozone concentration than the gas in the tank 70. Therefore, the flow recirculation in the direction of arrow 71 is induced by two mechanisms: 1) an increase in density of the gas in the ozone generator 64 as a result of converting oxygen into ozone, and 2) an increase in density as a result of cooling the gas in the ozone generator.

Certain types of ozone generators, such as the ozone generator 90 in FIG. 5A, may generate heat energy that if not dissipated will adversely affect operation of the ozone generator. In such cases, as will be discussed later, the cooling system 76 not only cools the gas in the ozone generator 64 but also extracts the heat energy from the ozone generator 90.

The system 60 can operate in a batch mode as the system 10. During the storage phase, an optional feedback control system 61 may activate the ozone generator 64 (and cooling system 76 if needed) when the ozone concentration is below an intended level thereby to maintain the intended ozone concentration in the tank 70.

Figure 4:
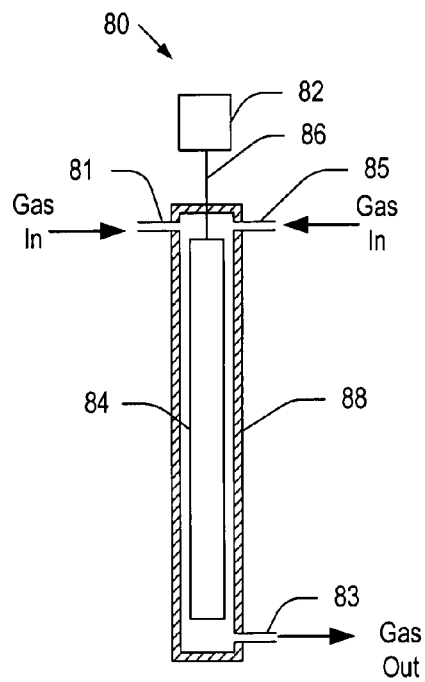
FIG. 4 shows a schematic diagram of an exemplary ozone generator of the type to be used in the systems of FIGS. 1-3.
Figure 8:
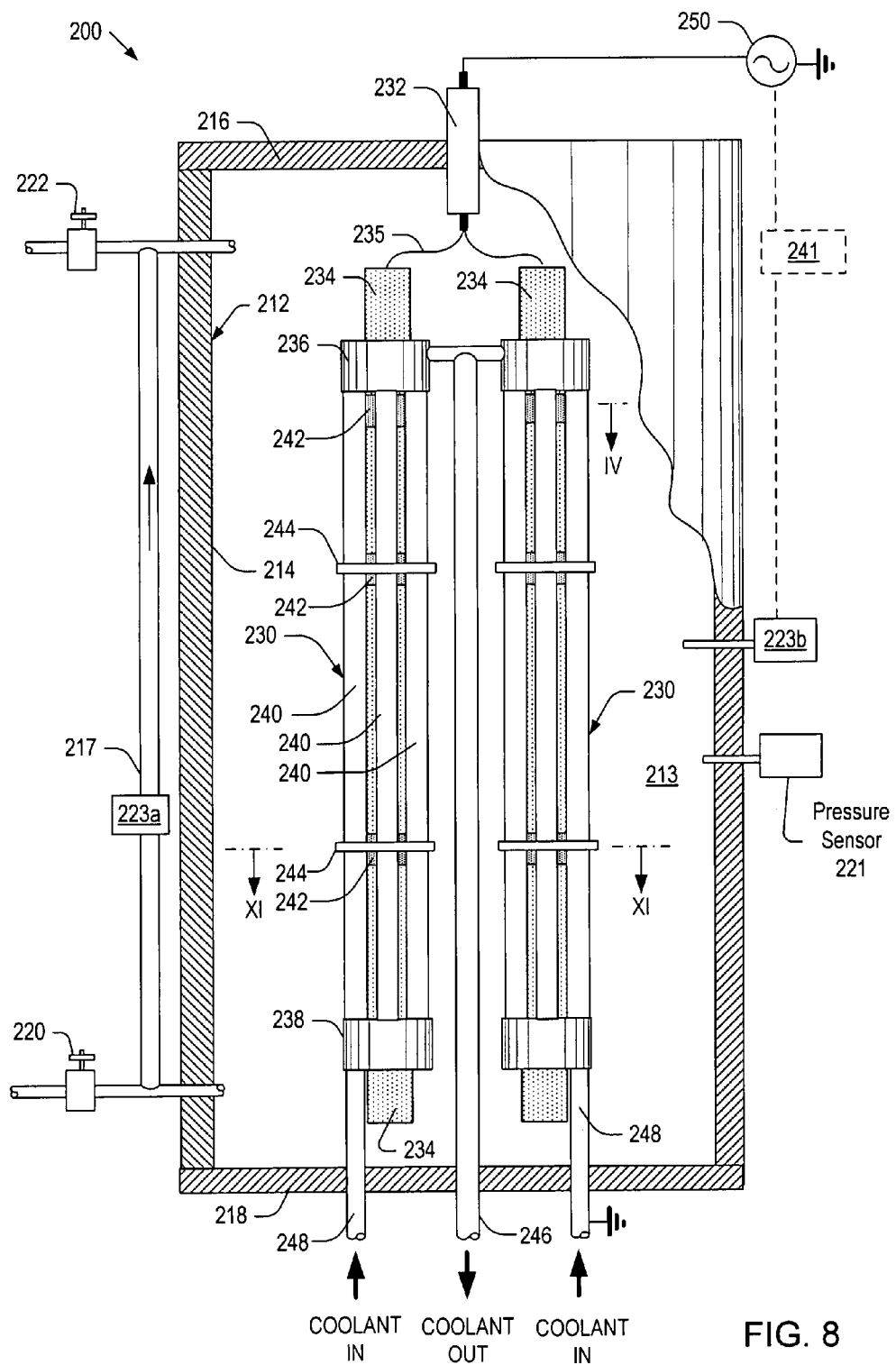
FIG. 8 shows a schematic partial cut away view of another further embodiment of an ozone generation system in accordance with the present invention.

FIG. 4 shows a schematic diagram of an exemplary ozone generator 80 of the type to be used in the systems of FIGS. 1-3. The ozone generator 80 includes a power supply 82, an ozone generating unit 84, a tube 88 for conducting a flow of gas past the ozone generating unit 84, and a conducting wire 86 for transmitting power from the power supply 82 to the ozone generating unit 84. The ozone generating unit 84 can be of various types. In one exemplary embodiment, the ozone generating unit 84 includes one or more UV lamps, wherein the power supply 82 is a UV lamp power supply. Oxygen gas flows into the ozone generator 80 through inlet 85 and flows out of the ozone generator through the gas outlet 83. As the oxygen gas traverses the tube 88, it is bombarded with radiation emitted by the UV lamps and converted into ozone gas. In another exemplary embodiment, the ozone generating unit 84 includes one or more electrode assemblies 230 (FIGS. 8-11) coupled to a power supply 250 (FIG. 8). In yet another exemplary embodiment, the ozone generating unit 84 includes a corona discharge unit 101 (FIGS. 5A and 5B). Detailed descriptions of the electrode assembly 230 and discharge unit 101 will be given later. Those skilled in the art will understand that other types of ozone generators may also be used, such as those utilizing concentric tubular or parallel flat plate type electrodes.

The ozone gas exiting the gas outlet 83 is transferred to a tank by a circulation pump (20, 40) or thermal convection (71). The ozone generator 80 includes a gas inlet 85 coupled to a tank (24, 44, or 70) for fluid communication between the ozone generator and tank. The gas exiting the gas outlet 83 flows into the tank and the gas in the tank flows into the ozone generator 80 through the gas inlet 85, completing the recirculation cycle within the ozone generation systems in FIGS. 1-3.

FIG. 5A shows a schematic diagram of another exemplary ozone generator 90 that might be used in the systems of FIGS. 1-3. FIG. 5B is an enlarged view of a portion of the ozone generator 90 in FIG. 5A. As depicted, the ozone generator 90 is a corona discharge ozone generator and includes a tube 96 for conducting a flow of gas through a discharge unit 101 secured to the inner surface of the tube 96, a power supply 92, a conducting wire 94 for transmitting electrical power from the power supply 92 to the discharge unit 101, and a coolant jacket 104 surrounding the outer surface of the tube 96. The ozone generator 90 further includes a gas inlet 95 and a gas outlet 93 that are respectively similar to the inlet 85 and outlet 83, i.e., the ozone generator 90 may be in fluid communication with a tank through the gas inlet 95 and gas outlet 93.

The tube 96 is formed of electrically and thermally conductive material, such as stainless steel. In one exemplary embodiment, the tube 96 is grounded and operates as a ground electrode. The discharge unit 101 is secured to the inner surface of the tube 96 and includes a dielectric substrate 98 and a high-voltage electrode 100 coupled to the power supply 92 via the conducting wire 94. In one exemplary embodiment, the high-voltage electrode 100 is secured to the inner surface of the substrate 98. The high-voltage electrode 100 has a generally grid shape such that a corona discharge or plasma 102 is established between the grid lines of the electrode 100 and the surface of the substrate 98 when the power supply 92 applies an electrical potential across the high-voltage grid 100 and ground electrode 96. Oxygen gas is converted into ozone gas by the corona discharge 102, as it passes through the discharge unit 101. The high-voltage grid 100 is preferably, but not limited to, formed of electrical conductor foil or plating applied to the dielectric substrate 98, and patterned to have a grid shape. The dielectric substrate 98 is formed of electrically insulating material, such as glass, quartz or ceramic.

The outer surface of the tube 96 and coolant jacket 104 form a passageway 106 through which coolant, such as Freon® or water, flows. The coolant jacket 104 has a coolant inlet 97 and a coolant outlet 99 and is connected to a cooling system (such as 76 in FIG. 3). A portion of the energy of the corona discharge 102 is converted into heat energy that if not dissipated will increase the temperature of the ozone gas in the ozone generator 90, causing some of the ozone to decompose back into oxygen. The coolant passing through the passageway 106 extracts the heat energy and transfers the extracted heat energy to the cooling system. The coolant can also cool the gas in the ozone generator 90, generating a thermal convection flow between the ozone generator and a tank (such as 70 in FIG. 3) through the gas outlet 93 and gas inlet 95.

Figure 6:
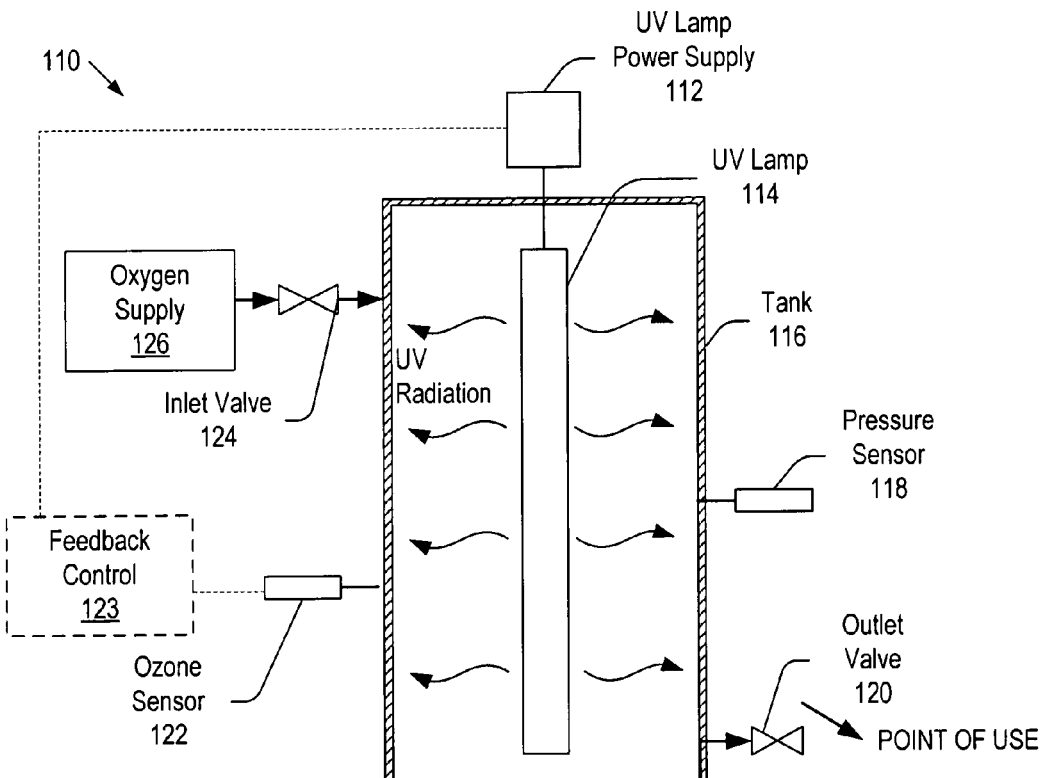
FIG. 6 shows a schematic diagram of still another embodiment of an ozone generation system in accordance with the present invention.

FIG. 6 shows a schematic diagram of still another embodiment of an ozone generation system 110 in accordance with the present invention. As depicted, the ozone generation system 110 is an integral system, i.e., an ozone generator, which is a UV lamp(s) 114, is disposed in a tank 116. Hereinafter, the term integral system refers to an ozone generation system that includes a tank for containing/storing ozone gas and an ozone generator disposed in the tank. The UV lamp 114 is powered by a UV lamp power supply 112 and emits UV radiation to convert oxygen gas into ozone gas. The system 110 includes an inlet valve 124 for filling the tank 116 with oxygen gas from an oxygen supply 126 and an outlet valve 120 for discharging the gas in the tank to a point of use. The system 110 also includes an ozone sensor 122 and a pressure sensor 118 for respectively monitoring the ozone concentration and gas pressure in the tank 116.

The system 110 can be operated in a similar manner as the system 10 in FIG. 1. In the continuous mode, both the inlet valve 124 and outlet valve 120 are open to provide a continuous flow of ozone gas to the point of use. In the batch mode, the system 110 is operated in a similar manner as the system 10 in FIG. 1. As a first step of the batch mode operation, the inlet valve 124 opens to fill the system 110 with oxygen gas from the oxygen supply 126 while the outlet valve 120 is closed. When a desired pressure is reached in the tank 116, the inlet valve 124 is closed and the UV lamp 114 runs until the ozone sensor 122 indicates that the ozone concentration has reached an intended level. Then, the UV lamp 114 is turned off and the system 110 enters a storage phase.

During the storage phase, an optional feedback control system 123 can be used to maintain the ozone concentration level. The ozone sensor 122 measures the ozone concentration and may send an electrical signal commensurate with the concentration to the feedback control system 123. If the ozone concentration in the tank 116 is below the intended level due to the natural decay, the feedback control system 123 may activate the UV lamp 114 to make up for the loss of ozone in the tank due to the natural decay and thereby to restore and maintain the ozone concentration level in the tank. Upon request, the outlet valve 120 opens to transfer the ozone gas in the tank 116 to the point of use, completing a batch mode cycle.

Figure 7:
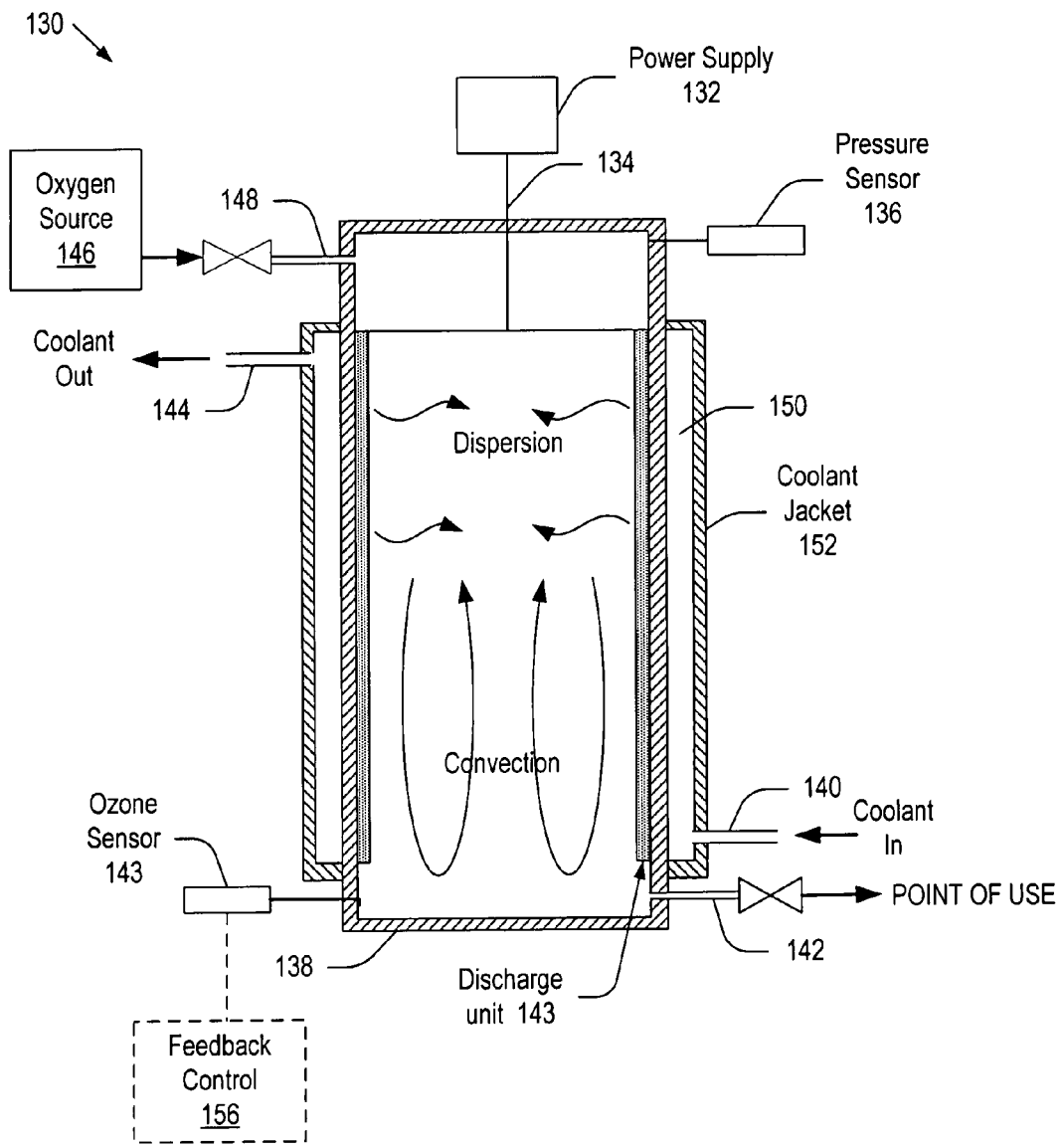
FIG. 7 shows a schematic diagram of a further embodiment of an ozone generation system in accordance with the present invention.

FIG. 7 shows a schematic diagram of a further embodiment of an ozone generation system 130 in accordance with the present invention. As depicted, the ozone generation system 130 is an integral system that includes a corona discharge ozone generator disposed within a tank 138. The discharge unit 143 is similar to the discharge unit 101 (FIG. 5B), i.e., the power supply 132 coupled to a high-voltage grid (not shown in FIG. 7 for brevity) via a conducting wire 134 applies en electrical potential across the high-voltage grid and ground electrode to establish corona discharge. The wall of the tank 138 operates as the ground electrode. The outer surface of the tank 138 and a coolant jacket 152 form a passageway 150 for coolant to dissipate the heat energy generated by the corona discharge.

The system 130 can be operated in the similar manner as the system 110 with the difference that the corona discharge unit 143 coupled to the power supply 132 performs the ozone generation function in place of the UV lamp 114.

FIG. 8 shows a schematic partial cut away view of another further embodiment of an ozone generation system in accordance with the present invention. Detailed description of the ozone generation system can be found in the previously referenced U.S. patent application Ser. No. 11/897,390, filed on Aug. 29, 2007, entitled "Ozone Generating Device" which is hereby incorporated by reference in its entirety. As depicted, the ozone generator system 200 is an integral system that includes a tank or container 212 having a side wall 214, a top end wall 216 and a bottom end wall 218, forming a working space 213 therewithin. The side wall 214 may have a generally circular cylindrical shell shape or other suitable hollow shapes. The container 212 is formed of preferably, but not limited to, sheet material, such as stainless steel, that can stand the caustic effect of ozone.

The system 200 also includes an inlet valve 222 for filling the container 212 with oxygen gas provided by an oxygen source and an outlet valve 220 for discharging ozone/oxygen gas from the container to a point of use. The outlet valve 220 may be in fluid communication with another device, such as sterilization chamber, that utilizes the ozone transferred thereto through the outlet valve 220. Optionally, a pipe or tube 217 may be coupled to the inlet and outlet valves, generating flow therethrough by thermal convection, i.e., denser gas moves down in the container 212 to induce upward flow in the tube 217. The system 200 includes at least one ozone sensor to measure the ozone concentration in the container 212. In an exemplary embodiment, the ozone sensor 223a is mounted in the tube 217 to measure the ozone concentration of the gas in the tube 217. In another exemplary embodiment, an ozone sensor 223b is attached directly to the wall 214.

The system 200 also includes one or more electrode assemblies 230 disposed in the working space 213. Each electrode assembly 230 has a high-voltage electrode unit 234, one or more ground electrodes 240, an upper coolant manifold 236, a lower coolant manifold 238, an inlet pipe 248 attached to the lower coolant manifold 238 and in fluid communication with the ground electrodes 240 and upper coolant manifold 236. The upper coolant manifold 236 is coupled to an outlet pipe 246 that is connected to a cooling system (not shown in FIG. 8 for brevity). Optionally, the electrode assembly 230 includes one or more spacers 242 for separating the high-voltage electrode unit 234 from the ground electrodes 240 so that the high-voltage electrode unit 234 may be arranged in a spaced-apart relationship with the ground electrodes 240.

The ground electrodes 240 are disposed circumferentially about the longitudinal axis of the high-voltage electrode unit 234, positioned in parallel to the unit 234, and secured to the unit 234 by one or more retaining rings 244. Both ends of each ground electrode 240 are respectively connected to the upper coolant manifold 236 and lower coolant manifold 238 such that the ground electrodes are in fluid communication with the upper and lower coolant manifolds. The high-voltage electrode unit 234 is coupled to a power supply 250 via high-voltage feed-through 232 securely mounted in the top end wall 216.

FIG. 9 shows a schematic perspective view of the electrode assembly 230 in FIG. 8. As depicted in FIGS. 8 and 9, the high-voltage electrode unit 234 includes an elongated dielectric tube 260 and a conducting layer 262 disposed on the inner surface of the dielectric tube. The dielectric tube 260 is formed of electrically insulating material, such as glass or ceramic. The conducting layer 262 may be a conducting rod or tube while the dielectric tube 260 may be formed by coating a dielectric layer on the outer surface of the conducting rod or tube. As such, the terms dielectric tube, dielectric layer, and dielectric member are used interchangeably hereinafter.

Likewise, the terms conducting layer, conducting tube, and conducting member are used interchangeably for the similar reasons. The conducting layer 262 may be made of a thin metallic foil, such as 0.025 mm-thick stainless steel foil, and secured to the inner surface of the dielectric tube 60. Alternatively, the conducting layer 262 may be formed by coating the inner surface of the tube 260 with metal, such as silver. One end of the conducting wire 235 (in FIG. 8) is secured to the conducting layer 262 such that the conducting layer 262 operates as an electrode. The inner and outer diameters of the dielectric tube 260 are preferably, but not limited to, 12 mm and 14 mm, respectively.

Each of the ground electrodes 240 has a generally elongated tubular shape and arranged parallel to the high-voltage electrode unit 234. The transverse cross section of the ground electrode 240 may be of any suitable shape, even though a ring shaped cross section is shown in the present document for the purpose of illustration. The ground electrodes 240 are formed of material that is both electrically and thermally conductive, such as metal, and grounded via the inlet pipe 248 or outlet pipe 246. The inner and outer diameters of the ground electrode 240 are preferably, but not limited to, about 5 mm and 6 mm, respectively. The ground electrodes 240 and conducting layer 262 of the high-voltage electrode unit 234 form a pair of electrodes for generating ozone through the plasma (or, equivalently corona discharge) established between the dielectric tube 260 and ground electrodes 240 during operation.

The power source 250 (FIG. 8) generates an alternating current preferably at the frequency of about 900 Hz and peak-to-peak voltage of 16 KV, even though the power source 250 may provide alternating current at other suitable frequencies and voltages. When the power supply 250 applies the alternating electrical potential across the conducting layer 262 and ground electrodes 240, a corona discharge is established between the dielectric tube 260 and ground electrodes 240. A portion of the energy of the corona discharge is converted into heat energy that if not dissipated will increase the temperatures of gas in the working space 213, ground electrodes 240, high-voltage electrode unit 234, and container 212. The heat energy also increases the temperature of the gas in the corona discharge itself. The coolant passing through the ground electrodes 240 extracts the heat energy and flows through the upper coolant manifold 236 and outlet pipe 246, thereby to transfer the extracted heat energy to a cooling system. A conventional cooling system based on suitable coolant, such as Freon® or water, can be used to dissipate the heat energy from the system 200.

The coolant received from a cooling system through the inlet pipe 248 is distributed to the ground electrodes 240 by the lower coolant manifold 238 and collected and directed to the outlet pipe 246 by the upper coolant manifold 236. Each of the upper and lower coolant manifolds 236, 238 is a generally cylindrical container having top and bottom end walls with the high-voltage electrode unit 234 penetrating through the end walls, i.e., the manifolds 236, 238 have a generally hollow ring shape. The manifolds 236, 238 are formed of electrically conducting material, such as stainless steel. The inlet pipes 248 and outlet pipe 246 are formed of preferably, but not limited to, stainless steel.

FIG. 10 shows a schematic cross sectional view of the bottom portion of the electrode assembly 230 in FIG. 9, taken along the line X-X. As depicted, the conducting layer 262 does not extend down to the bottom end of the dielectric tube 260, i.e., the bottom end of the conducting layer 262 is recessed from the bottom end of the dielectric tube 260 by a distance D, to obviate an electric arc between the coolant tube 248 and the conducting layer 262.

The system 200 can operate as an ozone storage system. Upon filling the container 212 with a predetermined volume of oxygen gas, the inlet valve 222 and outlet valve 220 are closed and the power supply 250 provides an alternating current to the electrode assemblies 230 such that the assemblies 230 convert the oxygen gas into ozone gas until the ozone concentration reaches the intended level. Then, the system 200 may enters storage phase until the ozone gas is discharged to a point of use through the outlet valve 220.

During the storage phase, an optional feedback control system 241 can be used to maintain the ozone concentration level. It is well known that ozone gas continuously decays back into oxygen gas. The ozone sensor 223b (or the sensor 223a) measures the ozone concentration and may send an electrical signal commensurate with the concentration to the feedback control system 241. If the ozone concentration in the container 212 decreases below the intended level due to the natural decay, the feedback control system 241, which can include a microprocessor, may send a signal to reactivate the power supply 250 so that the electrode assemblies 230 can regenerate ozone gas to make up for the loss of ozone due to the natural decay and thereby to restore and maintain the concentration level.

FIG. 11 shows a schematic cross sectional view of the electrode assembly 230 in FIG. 8, taken along the line XI-XI. As depicted, the retaining ring 244 holds the ground electrodes 240 in place with respect to the high-voltage electrode unit 234, while the ground electrodes 240 are spaced-apart from the unit 234 by spacers 242. The inner surface of the retaining ring 244 is contoured to follow the outer surfaces of the ground electrodes 240 in order to establish and maintain a uniform spacing between the electrodes 240. The retaining ring 244 is an external retaining ring and formed of elastic material, such as spring tempered stainless steel for the purpose of holding the ground electrodes 240 in contact with the spacer 242. It is noted that the spacer 242 is an optional component. In an alternative embodiment, the assembly 230 does not include any spacer such that the ground electrodes 240 are in direct contact with the dielectric tube 260 by the retaining ring 244.

The systems in FIGS. 1-11 can be applied to various applications that require a periodic or intermittent use of ozone gas, some requiring a large quantity of ozone gas in the shortest time possible. An example of this type of application would be a batch type sterilization process. In a batch type sterilization process using ozone, a sterilization chamber is first loaded with the articles to be sterilized. Then, the chamber is evacuated and then backfilled with ozone. Each of the systems 10, 30, 60, 110, 130, and 200 is able to provide a sufficient quantity of ozone pre-prepared in its tank and thereby ready to immediately transfer the ozone to the sterilization chamber upon demand. The systems 10, 30, 60, 110, 130, and 200 can also replenish the oxygen in their tanks after the ozone has been transferred to the sterilizer and again, regenerate the ozone in the tank for the next sterilization cycle.

It should be understood, of course, that the foregoing relates to exemplary embodiments of the invention and that modifications may be made without departing from the spirit and scope of the invention as set forth in the following claims.

What is claimed is:

1. A device for generating ozone, comprising:
   a tank for containing gas therein;
   an ozone generator for generating ozone and communicating the ozone with said tank to store the ozone into the tank;
   at least one valve for admitting gas into said device, holding gas in said device, and discharging gas from said device;
   a gas line coupled to said ozone generator and said tank to provide a fluid communication between said ozone generator and said tank; and
   a throttle coupled to said gas line and operative to control a rate of gas flow from said tank to said ozone generator.

2. A device as recited in claim 1, further comprising:
   a circulating pump for transferring ozone generated by said ozone generator to said tank.

3. A device as recited in claim 1, further comprising:
   a cooling system coupled to said ozone generator and operative to cool gas in said ozone generator thereby to cause the gas in said ozone generator to flow into said tank by a thermal convection.

4. A device as recited in claim 1, wherein said ozone generator includes:
   at least one UV lamp positioned within said tank and operative to emit radiation for converting gas in said tank into ozone during operation.

5. A device as recited in claim 1, wherein said ozone generator includes:
   a dielectric substrate secured to an inner surface of said tank, said tank being grounded to operate as a ground electrode; and
   an electrode having one or more grid lines, positioned on an inner surface of said substrate, and operative to generate corona discharge between said grid lines and said inner surface of said substrate upon application of an electrical potential across said electrode and said tank,
   wherein gas in said tank is converted into ozone by said corona discharge.

6. A device as recited in claim 5, further comprising:
   a coolant jacket surrounding a portion of an outer surface of said tank to form a passageway for coolant between said outer surface and said jacket.

7. A device as recited in claim 1, wherein said ozone generator includes:
   an electrode assembly including:
      at least one elongated electrode unit including an outer tubular dielectric member and an inner conducting member disposed along a longitudinal axis thereof; and
      one or more elongated electrode tubes disposed circumferentially about said longitudinal axis and in parallel to said electrode unit,
   wherein said conducting member and electrode tubes are operative to generate plasma between said dielectric member and said electrode tubes upon application of an electrical potential across said conducting member and said electrode tubes and wherein said plasma converts oxygen gas into ozone gas.

8. A device as recited in claim 7, further comprising:
   a cooling system in fluid communication with said electrode tubes.

9. A device as recited in claim 1, further comprising:
   an ozone sensor for measuring the ozone concentration in said device and generating a signal commensurate with the ozone concentration; and
   a system responsive to the signal and operative to activate said ozone generator as the ozone concentration decreases below a preset level so that the ozone concentration is maintained at said preset level.

10. A method for operating an ozone generation device including a tank and an ozone generator in fluid communication with said tank, comprising:
   providing gas including oxygen into said device;
   causing said ozone generator to convert part of the oxygen into ozone;
   transferring the ozone from said ozone generator to said tank to thereby store the ozone into the tank; and
   transferring a portion of the gas in said tank to said ozone generator via a pipe in order to induce recirculation of the gas in said ozone generation device.

11. A method as recited in claim 10, wherein the step of transferring the ozone from said ozone generator to said tank includes:
   disposing a circulating pump between an outlet of said ozone generator and an inlet of said tank; and
   causing said circulating pump to receive the ozone from said ozone generator through said outlet and to send the ozone to said inlet of said tank.

12. A method as recited in claim 10, wherein the step of transferring a portion of the gas in said tank includes:
   disposing a throttle in said pipe so that said ozone generator operates at a lower pressure than a pressure of the gas in said tank.

13. A method as recited in claim 10, further comprising:
   cooling the ozone.

14. A method as recited in claim 10, wherein said ozone generator includes an UV lamp that emits radiation for converting oxygen into ozone.

15. A method as recited in claim 10, wherein said ozone generator generates corona discharge plasma for converting oxygen into ozone.

16. A method as recited in claim 10, wherein said ozone generator is disposed within said tank.

17. A method as recited in claim 10, wherein said ozone generator is made integral with said tank.

18. A method as recited in claim 10, further comprising:
   causing an ozone sensor coupled to said tank to generate a signal commensurate with an ozone concentration in the gas; and
   causing a control system coupled to said ozone generator to respond to the signal and to activate said ozone generator in order to convert a portion of the gas into ozone as the ozone concentration decreases below an intended level whereby the ozone concentration is maintained at the intended level.

19. A device for generating ozone, comprising:
   a tank for containing gas therein;
   an ozone generator for generating ozone and communicating the ozone with said tank to store the ozone into the tank;
   at least one valve for admitting gas into said device, holding gas in said device, and discharging gas from said device;
   a dielectric substrate secured to an inner surface of said tank, said tank being grounded to operate as a ground electrode; and
   an electrode having one or more grid lines, positioned on an inner surface of said substrate, and operative to generate corona discharge between said grid lines and said inner surface of said substrate upon application of an electrical potential across said electrode end said tank;
   wherein the gas in said tank is converted into ozone by said corona discharge.

* * * * *